(12) United States Patent
Masuda

(10) Patent No.: US 12,441,148 B2
(45) Date of Patent: Oct. 14, 2025

(54) CONTROLLER, VEHICLE, AND CONTROL METHOD

(71) Applicant: Robert Bosch GmbH, Stuttgart (DE)

(72) Inventor: Makoto Masuda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 18/011,183

(22) PCT Filed: Jun. 11, 2021

(86) PCT No.: PCT/IB2021/055139
§ 371 (c)(1),
(2) Date: Dec. 18, 2022

(87) PCT Pub. No.: WO2021/255598
PCT Pub. Date: Dec. 23, 2021

(65) Prior Publication Data
US 2023/0242097 A1    Aug. 3, 2023

(30) Foreign Application Priority Data
Jun. 18, 2020  (JP) ................................ 2020-105377

(51) Int. Cl.
*B60G 17/016* (2006.01)
*B60W 30/045* (2012.01)
*B60W 40/13* (2012.01)

(52) U.S. Cl.
CPC .. *B60G 17/0162* (2013.01); *B60G 2400/0521* (2013.01); *B60G 2400/0533* (2013.01);
(Continued)

(58) Field of Classification Search
CPC ........ B60G 17/0162; B60G 2400/0521; B60G 2400/0533; B60G 2400/44;
(Continued)

(56) References Cited

U.S. PATENT DOCUMENTS

| 5,172,929 A | 12/1992 | Butsuen et al. |
| 5,485,377 A | 1/1996 | Sasaki et al. |
| 6,295,493 B1 * | 9/2001 | Kawazoe ........... B60G 17/0162 280/5.506 |

FOREIGN PATENT DOCUMENTS

| DE | 102019200537 A1 * | 7/2020 |
| JP | H04317810 A * | 11/1992 |

(Continued)

OTHER PUBLICATIONS

Mizuno, JP 2002-331816, machine translation (Year: 2002).*
(Continued)

*Primary Examiner* — Mark L. Greene
(74) *Attorney, Agent, or Firm* — Michael Best & Friedrich LLP

(57) ABSTRACT

To obtain a controller capable of controlling a regular circular turning characteristic of a vehicle during turning. A controller according to the present invention is a controller that is mounted to a vehicle including a shock absorber of a damping force adjustment type provided between a vehicle body and a wheel and outputs a command signal corresponding to a damping force of the shock absorber to an actuator that adjusts the damping force of the shock absorber. The controller is configured to output the command signal to the actuator to adjust the damping force of the shock absorber and control a regular circular turning characteristic of the vehicle when the vehicle is brought into a stable turning state where the vehicle turns in a state where a degree of a change in a physical quantity associated with a travel posture is smaller than that in a reference state.

6 Claims, 7 Drawing Sheets

(52) U.S. Cl.
    CPC ...... *B60G 2400/44* (2013.01); *B60G 2800/24* (2013.01); *B60W 30/045* (2013.01); *B60W 2040/133* (2013.01)

(58) Field of Classification Search
    CPC ............. B60G 2800/24; B60W 30/045; G05D 1/0061; G05D 1/0088; G05D 1/021; G05D 1/0214; G05D 1/0221; G05D 1/0223
    See application file for complete search history.

(56) References Cited

FOREIGN PATENT DOCUMENTS

| | | | |
|---|---|---|---|
| JP | H07179113 A | | 7/1995 |
| JP | H07290924 A | * | 11/1995 |
| JP | H11115440 A | * | 4/1999 |
| JP | 2917425 B2 | * | 7/1999 |
| JP | 2002331816 A | * | 11/2002 |
| JP | 2009154759 A | | 7/2009 |
| KR | 19990015694 A | * | 3/1999 |

OTHER PUBLICATIONS

Yoshioka, JP H04-317810, machine translation. (Year: 1992).*
International Search Report and Written Opinion for Application No. PCT/IB2021/055139 dated Sep. 16, 2021 (10 pages).

* cited by examiner

[FIG. 1]
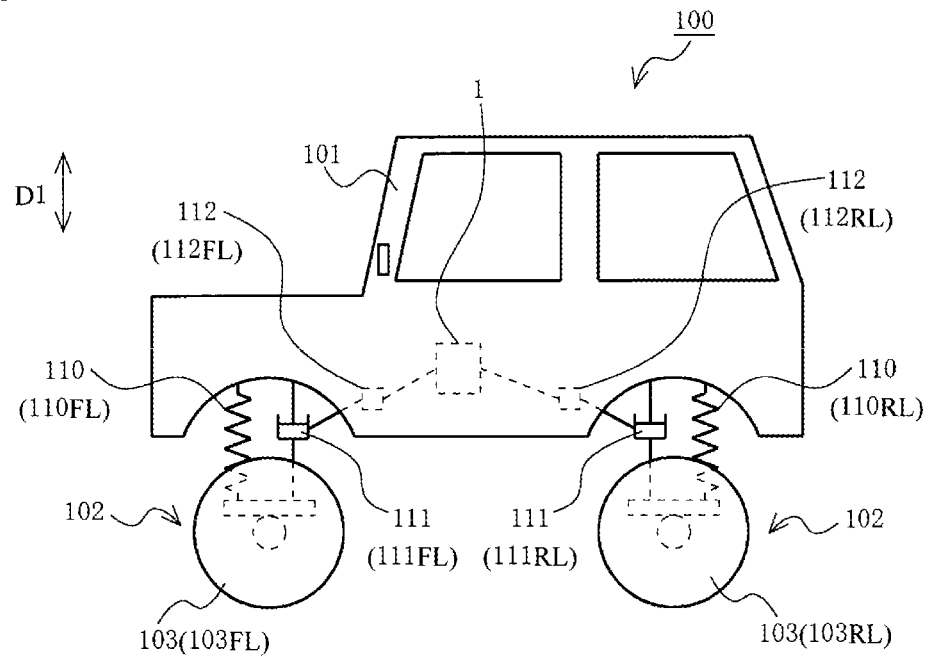
[FIG. 2]
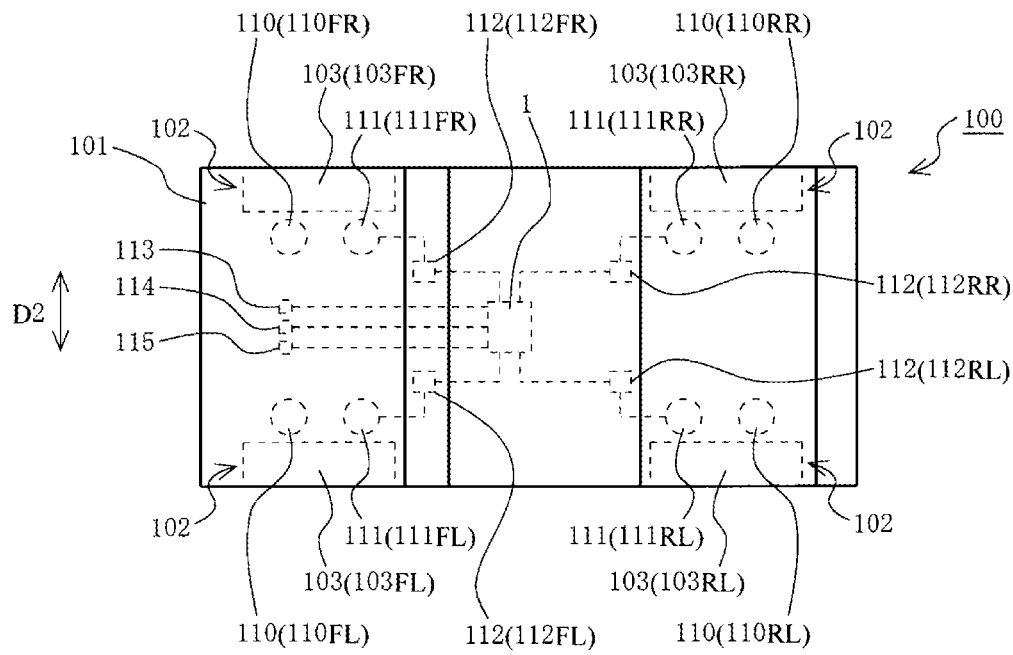

[FIG. 3]
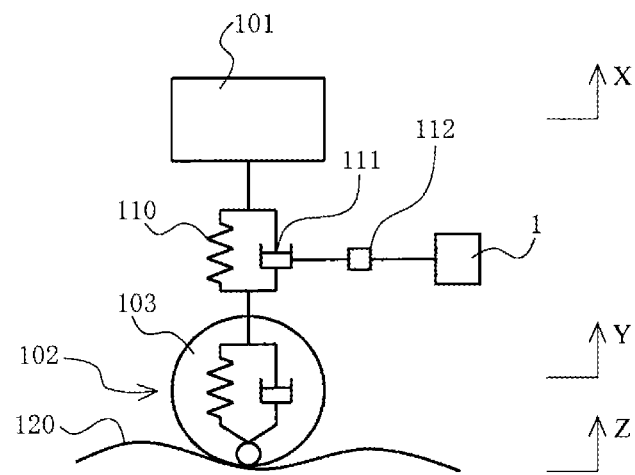
[FIG. 4]
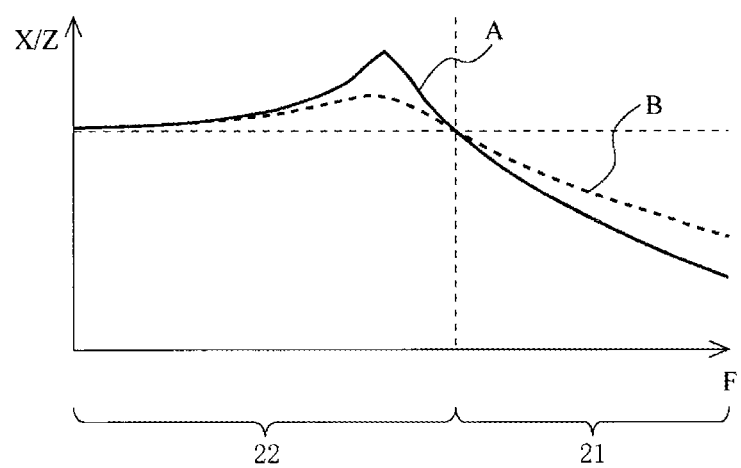

[FIG. 5]
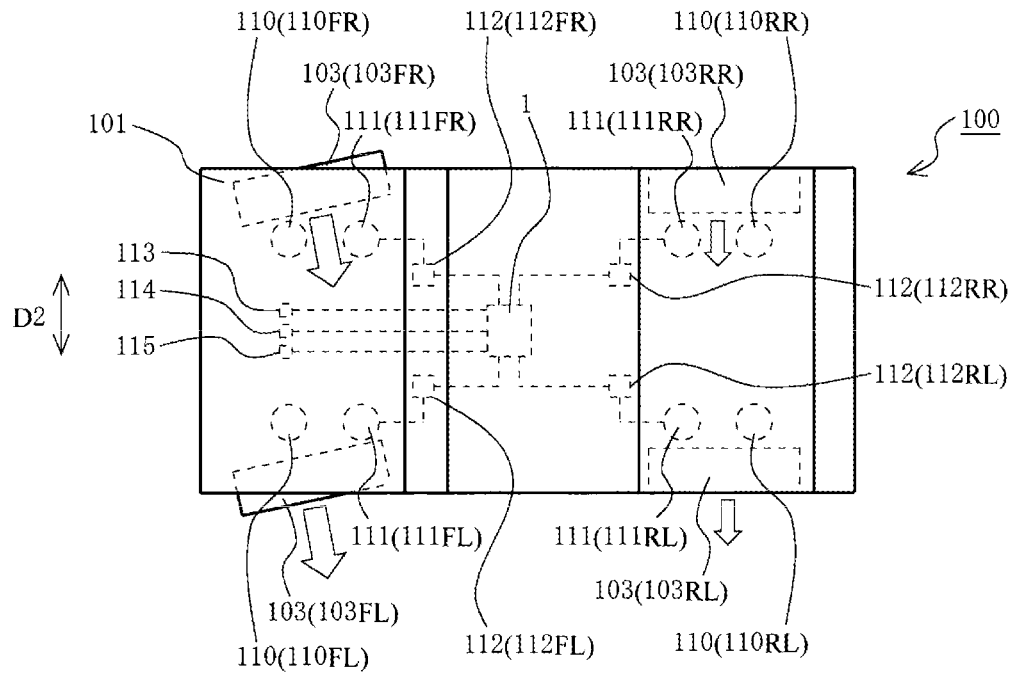
[FIG. 6]
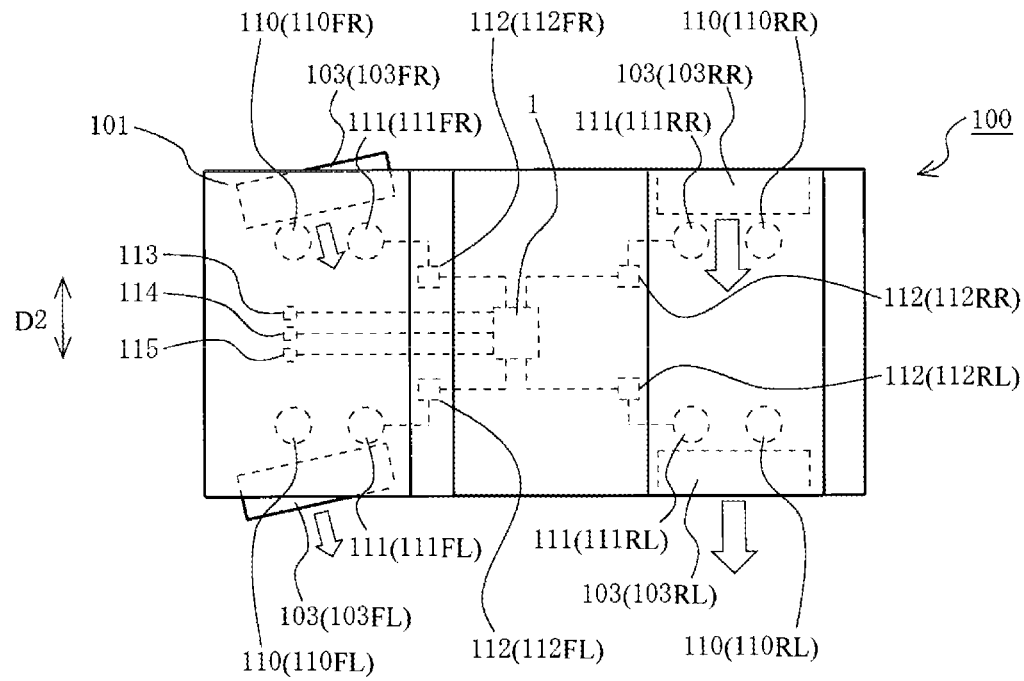

[FIG. 7]
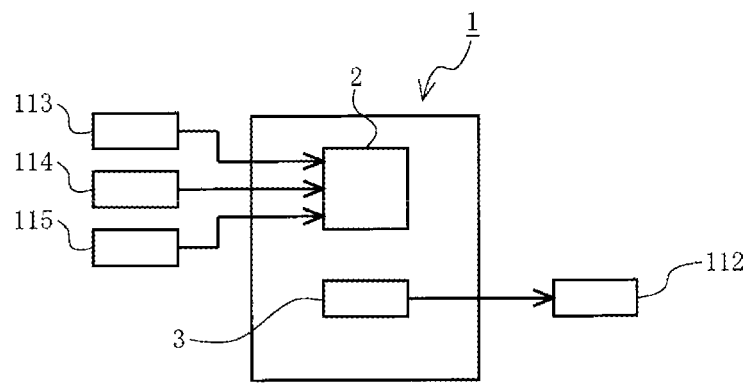
[FIG. 8]
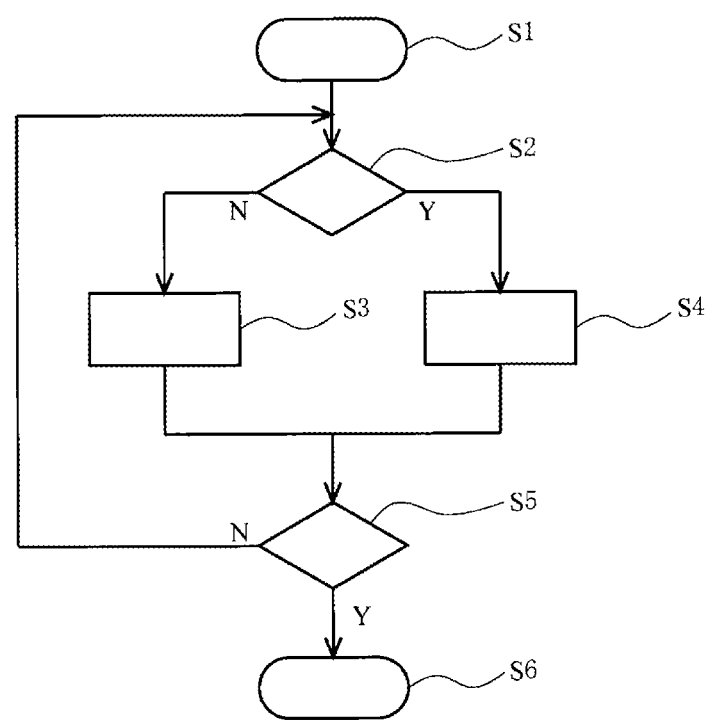

[FIG. 9]
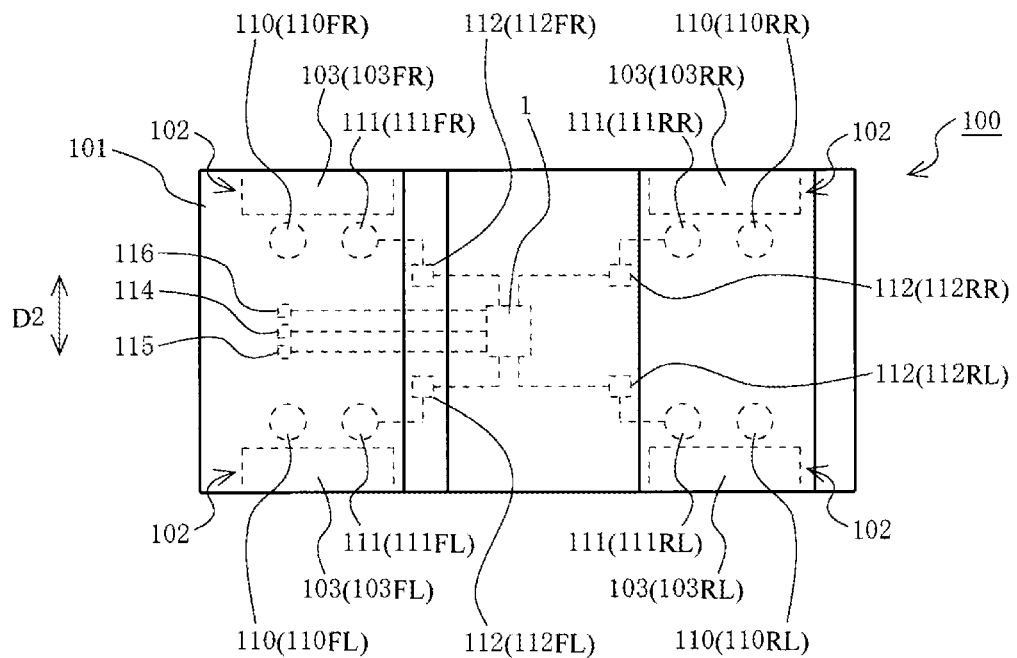
[FIG. 10]
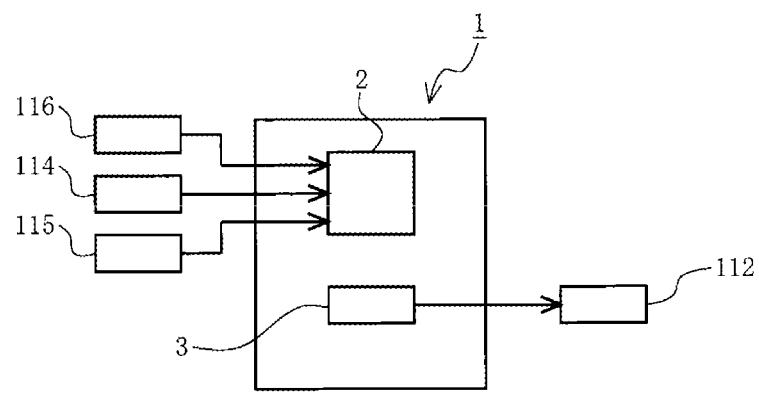

[FIG. 11]
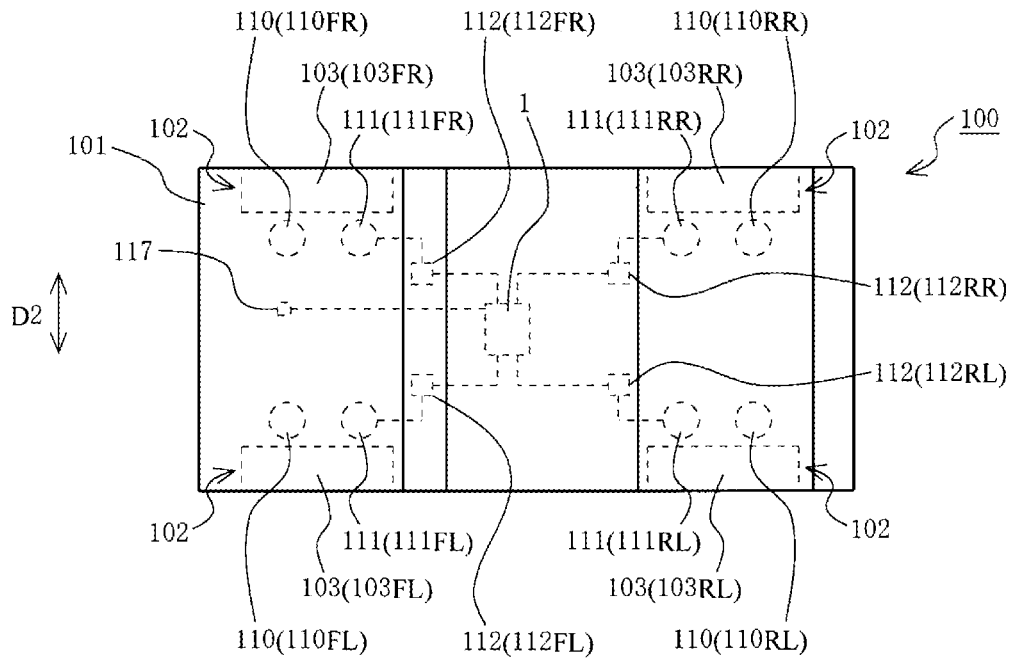
[FIG. 12]
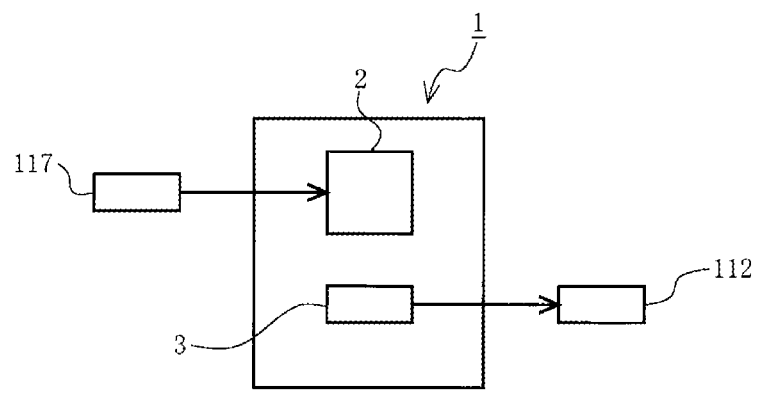

[FIG. 13]
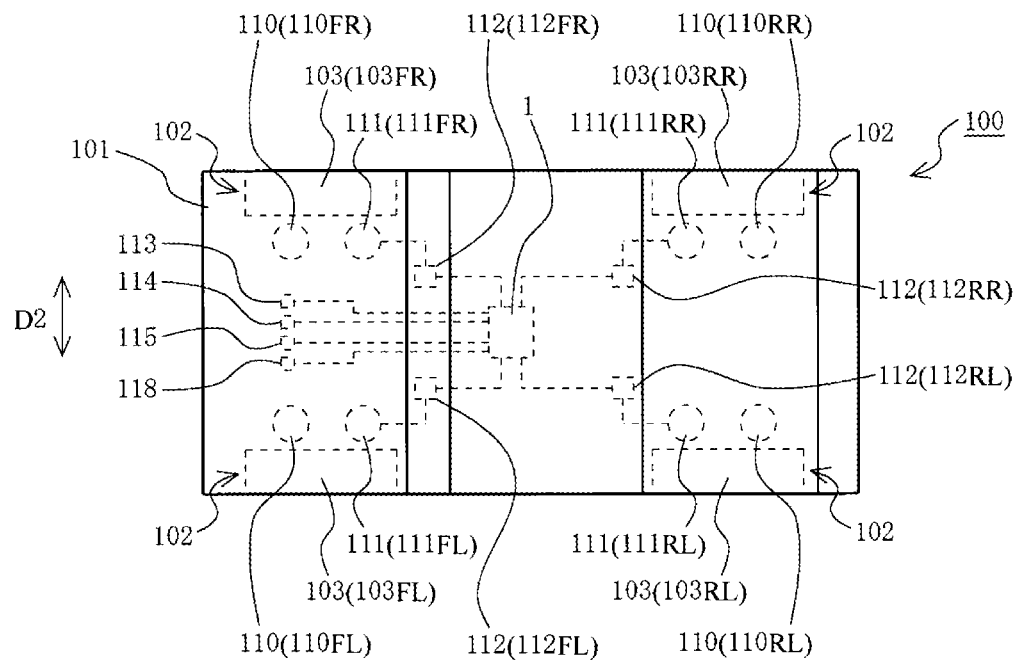
[FIG. 14]
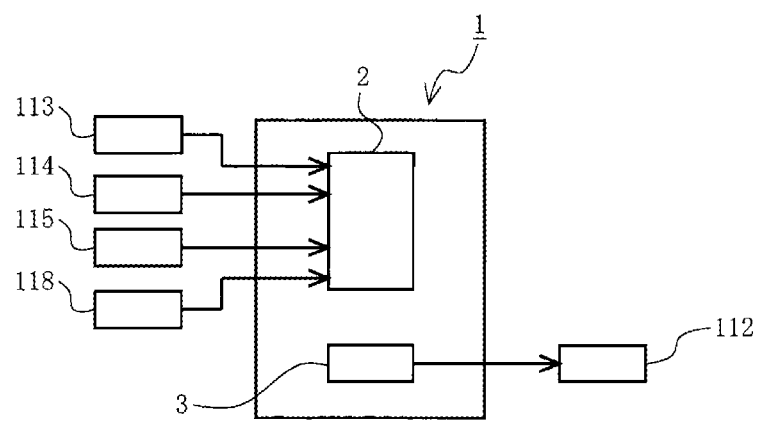

CONTROLLER, VEHICLE, AND CONTROL METHOD

BACKGROUND OF THE INVENTION

The present invention relates to a controller used to adjust a damping force of a shock absorber of a damping force adjustment type mounted to a vehicle, a vehicle including the controller, and a control method used to adjust the damping force of the shock absorber of the damping force adjustment type mounted to the vehicle.

Conventionally, a vehicle including a shock absorber of a damping force adjustment type between a vehicle body and a wheel has been known (see JP-A-7-179113). The conventional vehicle that includes the shock absorber of the damping force adjustment type between the vehicle body and the wheel adjusts a damping force of the shock absorber during turning of the vehicle so as to suppress rolling that occurs to a vehicle body.

SUMMARY OF THE INVENTION

Technical Problem

In consideration of turning performance, safety during turning, and the like, a preferred regular circular turning characteristic is set in advance per vehicle. The regular circular turning characteristic is a behavior characteristic that the vehicle exhibits when a vehicle speed is increased while a steering angle of a steering wheel remains constant during regular circular turning. More specifically, a vehicle, a turning radius of which is increased when the vehicle speed is increased while the steering angle of the steering wheel remains constant during the regular circular turning, is a vehicle, the regular circular turning characteristic of which is an understeer characteristic. On the other hand, a vehicle, a turning radius of which is reduced when the vehicle speed is increased while the steering angle of the steering wheel remains constant during the regular circular turning, is a vehicle, the regular circular turning characteristic of which is an oversteer characteristic. In general, the regular circular turning characteristic of the vehicle is set to the understeer characteristic.

In the conventional vehicle that includes the shock absorber of the damping force adjustment type between the vehicle body and the wheel, a damping force of the shock absorber is constantly adjusted during a turning period in order to suppress rolling that occurs to the vehicle body. In other words, a conventional controller that controls the damping force of the shock absorber of the damping force adjustment type constantly adjusts the damping force of the shock absorber during the turning period of the vehicle in order to suppress rolling that occurs to the vehicle body. Accordingly, there is a problem that, in the conventional vehicle including the shock absorber of the damping force adjustment type between the vehicle body and the wheel, the regular circular turning characteristic cannot be controlled during turning even when the regular circular turning characteristic differs from a desired regular circular turning characteristic.

The present invention has been made in view of the above-described problem as the background and therefore has a first purpose of obtaining a controller that is mounted to a vehicle including a shock absorber of a damping force adjustment type provided between a vehicle body and a wheel, that outputs a command signal corresponding to a damping force of the shock absorber to an actuator that adjusts the damping force of the shock absorber, and that can control a regular circular turning characteristic of the vehicle during turning. The present invention has a second purpose of obtaining a vehicle including such a controller. The present invention has a third purpose of obtaining a control method that is used for a vehicle including: a shock absorber of a damping force adjustment type provided between a vehicle body and a wheel; and an actuator that adjusts a damping force of the shock absorber, that outputs a command signal corresponding to the damping force of the shock absorber to the actuator, and that can control a regular circular turning characteristic of the vehicle during turning.

Solution to Problem

A controller according to the present invention is a controller that is mounted to a vehicle including a shock absorber of a damping force adjustment type provided between a vehicle body and a wheel and outputs a command signal corresponding to a damping force of the shock absorber to an actuator that adjusts the damping force of the shock absorber. The controller is configured to output the command signal to the actuator to adjust the damping force of the shock absorber and control a regular circular turning characteristic of the vehicle when the vehicle is brought into a stable turning state where the vehicle turns in a state where a degree of a change in a physical quantity associated with a travel posture is smaller than that in a reference state.

A vehicle according to the present invention includes: a vehicle body; a wheel; a shock absorber of a damping force adjustment type provided between the vehicle body and the wheel; an actuator that adjusts a damping force of the shock absorber; and the controller according to the present invention.

A control method according to the present invention is a control method for outputting a command signal corresponding to a damping force of a shock absorber to an actuator, the control method being used for a vehicle that includes: the shock absorber of a damping force adjustment type provided between a vehicle body and a wheel; and the actuator that adjusts the damping force of the shock absorber. The control method includes a regular circular turning characteristic control step of outputting the command signal to the actuator to adjust the damping force of the shock absorber and controlling a regular circular turning characteristic of the vehicle when the vehicle is brought into a stable turning state where the vehicle turns in a state where a degree of a change in a physical quantity associated with a travel posture is smaller than that in a reference state.

Advantageous Effects of Invention

Behavior of the vehicle body during turning of the vehicle is divided into a transient turning state and the stable turning state. The transient turning state is a state where the behavior of the vehicle body is not stabilized and the degree of the change in the physical quantity associated with the travel posture of the vehicle body becomes larger than that in the reference state. The stable turning state is a state where the behavior of the vehicle body is stabilized and the degree of the change in the physical quantity associated with the travel posture of the vehicle body becomes smaller than that in the reference state. That is, in the stable turning state, a compression/extension speed of the shock absorber is low. Thus, in the stable turning state, even when control for suppressing rolling that occurs to the vehicle body is executed, such control insignificantly contributes to the suppression of rolling.

To handle such a problem, in the stable turning state, the controller and the control method according to the present invention output the command signal to the actuator to adjust the damping force of the shock absorber and controls the regular circular turning characteristic of the vehicle. More specifically, when the damping force of the shock absorber is adjusted, a fluctuation in a contact patch load of the wheel (in detail, a tire of the wheel) varies. Thus, a grip force of the wheel (in detail, the tire of the wheel) can be changed. By using such a phenomenon, the controller and the control method according to the present invention control the regular circular turning characteristic of the vehicle in the stable turning state. Therefore, the controller and the control method according to the present invention can control the regular circular turning characteristic of the vehicle during turning.

BRIEF DESCRIPTION OF THE DRAWINGS

FIG. 1 is a side view of a vehicle according to an embodiment of the present invention.

FIG. 2 is a plan view of the vehicle according to the embodiment of the present invention.

FIG. 3 is a view for illustrating a way of controlling a damping force of each shock absorber by a controller according to the embodiment of the present invention.

FIG. 4 is a graph illustrating a relationship between a road surface input frequency F and a gain X/Z of the vehicle in the case where it is assumed that the damping force of the shock absorber illustrated in FIG. 3 is fixed and that a tire of the wheel is a rigid body.

FIG. 5 is a view for illustrating a control method for a regular circular turning characteristic that is executed by the controller according to the embodiment of the present invention in a stable turning state.

FIG. 6 is a view for illustrating the control method for the regular circular turning characteristic that is executed by the controller according to the embodiment of the present invention in the stable turning state.

FIG. 7 is a block diagram illustrating the controller according to the embodiment of the present invention.

FIG. 8 is a flowchart illustrating operation of the controller according to the embodiment of the present invention.

FIG. 9 is a plan view illustrating a modified example of the vehicle according to the embodiment of the present invention.

FIG. 10 is a block diagram illustrating the modified example of the controller according to the embodiment of the present invention and is a block diagram illustrating the controller mounted to the vehicle illustrated in FIG. 9.

FIG. 11 is a plan view illustrating another modified example of the vehicle according to the embodiment of the present invention.

FIG. 12 is a block diagram illustrating another modified example of the controller according to the embodiment of the present invention and is a block diagram illustrating the controller mounted to the vehicle illustrated in FIG. 11.

FIG. 13 is a plan view illustrating further another modified example of the vehicle according to the embodiment of the present invention.

FIG. 14 is a block diagram illustrating further another modified example of the controller according to the embodiment of the present invention and is a block diagram illustrating the controller mounted to the vehicle illustrated in FIG. 13.

DETAILED DESCRIPTION

A description will hereinafter be made on a controller and a vehicle according to the present invention with reference to the drawings.

A description will hereinafter be made on a four-wheeled motor vehicle as an example of the vehicle according to the present invention. However, the vehicle according to the present invention may be a vehicle other than the four-wheeled motor vehicle. Examples of the vehicle other than the four-wheeled motor vehicle are a pedal-driven vehicle, a two-wheeled motor vehicle, and a three-wheeled motor vehicle, each of which has at least one of an engine and an electric motor as a drive source. The pedal-driven vehicle means a vehicle in general that can travel forward on a road by a depression force applied to pedals. That is, the pedal-driven vehicles include a normal pedal-driven vehicle, an electrically-assisted pedal-driven vehicle, an electric pedal-driven vehicle, and the like. The two-wheeled motor vehicle or the three-wheeled motor vehicle means a so-called motorcycle, and the motorcycles include a bike, a scooter, an electric scooter, and the like.

A configuration, operation, and the like, which will be described below, constitute merely one example, and the present invention is not limited to a case with such a configuration, such operation, and the like. In the drawings, the same or similar members or portions will be denoted by the same reference sign or will not be denoted by the reference sign. In addition, a detailed structure will appropriately be illustrated in a simplified manner or will not be illustrated.

Embodiment

A description will hereinafter be made on a controller 1 according to an embodiment and a vehicle 100 that includes the controller 1.

<Configurations of Vehicle and Controller>

FIG. 1 is a side view of the vehicle according to the embodiment of the present invention. FIG. 2 is a plan view of the vehicle according to the embodiment of the present invention. In FIG. 1 and FIG. 2, a left side of each sheet corresponds to a front side of the vehicle 100.

The vehicle 100 is an off-road vehicle and includes a vehicle body 101 and wheels 103. More specifically, the vehicle 100 includes front wheels and rear wheels as the wheels 103. In addition, the vehicle 100 according to this embodiment is a four-wheeled motor vehicle and includes the two front wheels and the two rear wheels. More specifically, the vehicle 100 includes a front left wheel 103FL and a front right wheel 103FR as the front wheels. In addition, the vehicle 100 includes a rear left wheel 103RL and a rear right wheel 103RR as the rear wheels.

The vehicle 100 also includes a spring 110 and a shock absorber 111. The spring 110 and the shock absorber 111 are provided between the vehicle body 101 and each of the wheels 103. Thus, the vehicle 100 includes the four springs 110 and the four shock absorbers 111. More specifically, the vehicle 100 includes, as the springs 110, a spring 110FL, a spring 110FR, a spring 110RL, and a spring 110RR. The vehicle 100 includes, as the shock absorbers 111, a front wheel-side shock absorber 111FL, a front wheel-side shock absorber 111FR, a rear wheel-side shock absorber 111RL, and a rear wheel-side shock absorber 111RR.

The spring 110FL and the front wheel-side shock absorber 111FL are provided between the vehicle body 101 and the front left wheel 103FL. The spring 110FR and the front wheel-side shock absorber 111FR are provided between the vehicle body 101 and the front right wheel 103FR. The spring 110RL and the rear wheel-side shock absorber 111RL are provided between the vehicle body 101 and the rear left wheel 103RL. The spring 110RR and the rear wheel-side shock absorber 111RR are provided between the vehicle body 101 and the rear right wheel 103RR.

The shock absorber 111 according to this embodiment is a shock absorber of a damping force adjustment type. Thus, the vehicle 100 includes an actuator 112 that adjusts a damping force of the shock absorber 111. The actuator 112 is provided for each of the shock absorbers 111. More specifically, the vehicle 100 includes the four actuators 112. Furthermore specifically, the vehicle 100 includes, as the actuators 112, an actuator 112FL, an actuator 112FR, an actuator 112RL, and an actuator 112RR. The actuator 112FL adjusts a damping force of the front wheel-side shock absorber 111FL. The actuator 112FR adjusts a damping force of the front wheel-side shock absorber 111FR. The actuator 112RL adjusts a damping force of the rear wheel-side shock absorber 111RL. The actuator 112RR adjusts a damping force of the rear wheel-side shock absorber 111RR. Any of various known shock absorbers can be used as the shock absorber 111 as long as the shock absorber is of the damping force adjustment type.

The vehicle 100 includes the controller 1. More specifically, the controller 1 is mounted to the vehicle 100. Sections of the controller 1 may be disposed collectively or may be disposed separately. The controller 1 may be configured to include a microcomputer, a microprocessor unit, or the like, may be configured to include a member in which firmware and the like can be updated, or may be configured to include a program module or the like that is executed by a command from a CPU or the like, for example.

The controller 1 is electrically connected to the actuator 112. The controller 1 outputs a command signal to the actuator 112, and the command signal corresponds to the damping force of the shock absorber 111. More specifically, in this embodiment, the controller 1 outputs the command signal corresponding to the damping force of the front wheel-side shock absorber 111FL to the actuator 112FL. The controller 1 outputs the command signal corresponding to the damping force of the front wheel-side shock absorber 111FR to the actuator 112FR. The controller 1 outputs the command signal corresponding to the damping force of the rear wheel-side shock absorber 111RL to the actuator 112RL. The controller 1 outputs the command signal corresponding to the damping force of the rear wheel-side shock absorber 111RR to the actuator 112RR.

The command signal that is output from the controller 1 varies by a type of the shock absorber 111 and a type of the actuator 112. For example, in the case where the shock absorber 111 is configured that the damping force thereof is changed according to a value of an electric current into the actuator 112, the command signal output from the controller 1 is the electric current. That is, the controller 1 outputs the electric current of the value corresponding to the damping force of the shock absorber 111 to the actuator 112. Meanwhile, for example, in the case where the shock absorber 111 is configured that the damping force thereof is changed according to a value of a voltage into the actuator 112, the command signal output from the controller 1 is the voltage.

That is, the controller 1 outputs the voltage of the value corresponding to the damping force of the shock absorber 111 to the actuator 112.

The vehicle 100 includes at least one sensor that is electrically connected to the controller 1 and used to detect that the vehicle 100 is in a stable turning state. The stable turning state is a state where, during turning of the vehicle 100, behavior of the vehicle body 101 is stabilized and a degree of a change in a physical quantity associated with a travel posture of the vehicle body 101 becomes smaller than that in a reference state. In this embodiment, as will be described below, a roll rate of the vehicle body 101 is adopted as the physical quantity associated with the travel posture of the vehicle body 101. More specifically, a stable rolling state where, during turning of the vehicle 100, the roll rate of the vehicle body 101 is lower than that in the reference state is set as the stable turning state. For this reason, the vehicle 100 according to this embodiment includes a roll rate detection sensor 113 that detects the roll rate of the vehicle body 101. The roll rate detection sensor 113 is provided to the vehicle body 101.

In addition, in this embodiment, in order to improve reliability of such detection that the vehicle 100 is in the stable turning state, the vehicle 100 includes an acceleration sensor 114 and an acceleration sensor 115. The acceleration sensor 114 is provided to the vehicle body 101 and detects vertical acceleration of the vehicle body 101. In other words, the acceleration sensor 114 detects the acceleration in a direction D1 in FIG. 1 that is generated to the vehicle body 101. The acceleration sensor 115 is provided to the vehicle body 101 and detects lateral acceleration of the vehicle body 101. In other words, the acceleration sensor 115 detects the acceleration in a direction D2 in FIG. 2 that is generated to the vehicle body 101.

The roll rate detection sensor 113, the acceleration sensor 114, and the acceleration sensor 115 may be different sensors, or at least two sensors thereof may be constructed as one unit. For example, a so-called inertial measurement unit may be used as the roll rate detection sensor 113, the acceleration sensor 114, and the acceleration sensor 115. Alternatively, it may be configured that the roll rate detection sensor 113, the acceleration sensor 114, and the acceleration sensor 115 are provided to the controller 1.

Next, a description will be made on a way of controlling the damping force of each of the shock absorbers 111 by the controller 1 with reference to a two degree-of-freedom model drawing of one wheel illustrated in FIG. 3, which will be described below.

FIG. 3 is a view for illustrating the way of controlling the damping force of each of the shock absorbers by the controller according to the embodiment of the present invention. A sprung position X illustrated in FIG. 3 represents a position of the vehicle body 101 in a vertical direction. An unsprung position Y represents a position of an unsprung portion 102 in the vertical direction. In the vehicle 100, the unsprung portion 102 is a portion on the wheel 103 side with the shock absorber 111 being a reference. For example, the wheel 103, an unillustrated hub, an unillustrated axle, and the like are included in the unsprung portion 102. A road surface position Z represents a position of a contact between a road surface 120 and the wheel 103 in the vertical direction. A reference position of each of the sprung position X, the unsprung position Y, and the road surface position Z will be defined as follows. It is assumed that the vehicle 100 is stopped at any position on the road surface 120. The position of the vehicle body 101 in this state is set as the reference position of the sprung position X. The position of the unsprung portion 102 in this state is set as the reference position of the unsprung position Y. The position of the contact between the road surface 120 and the wheel 103 in this state is set as the reference position of the road surface position Z. That is, this means that vertical motion of the vehicle body 101 becomes more significant as a fluctuation in the sprung position X is increased. This also means that the vertical motion of the unsprung portion 102 becomes more significant as a fluctuation in the unsprung position Y is increased. This further means that irregularities of the road surface 120 in the vertical direction become more significant as a fluctuation in the road surface position Z is increased.

In order to understand the way of controlling the damping force of each of the shock absorbers 111 by the controller 1, FIG. 3 only needs to be viewed as follows. For example, in the case where the shock absorber 111 is the front wheel-side shock absorber 111FL, the actuator 112 is the actuator 112FL, the wheel 103 is the front left wheel 103FL, and the spring 110 is the spring 110FL. In the case where the shock absorber 111 is the front wheel-side shock absorber 111FR, the actuator 112 is the actuator 112FR, the wheel 103 is the front right wheel 103FR, and the spring 110 is the spring 110FR. In the case where the shock absorber 111 is the rear wheel-side shock absorber 111RL, the actuator 112 is the actuator 112RL, the wheel 103 is the rear left wheel 103RL, and the spring 110 is the spring 110RL. In the case where the shock absorber 111 is the rear wheel-side shock absorber 111RR, the actuator 112 is the actuator 112RR, the wheel 103 is the rear right wheel 103RR, and the spring 110 is the spring 110RR.

FIG. 4 is a graph illustrating a relationship between a road surface input frequency F and a gain X/Z of the vehicle in the case where it is assumed that the damping force of the shock absorber illustrated in FIG. 3 is fixed and that a tire of the wheel is a rigid body.

The road surface input frequency F represented on a horizontal axis of this FIG. 4 indicates a frequency that is input from the road surface 120 to the unsprung portion 102 during travel of the vehicle 100. On the horizontal axis of FIG. 4, the road surface input frequency F is increased to the right side of the sheet. The gain X/Z of the vehicle 100, which is represented on a vertical axis of FIG. 4, is acquired by dividing the sprung position X by the road surface position Z. On the vertical axis of FIG. 4, the gain X/Z is increased to the upper side of the sheet. The gain X/Z indicates that, as a value thereof is increased, the vehicle body 101 vibrates more significantly in the vertical direction with respect to the irregularities of the road surface 120. FIG. 4 also illustrates the relationships between the road surface input frequency F and the gain X/Z of the vehicle 100 at the time when the vehicle 100 is in a state A and a state B. Each of the state A and the state B is a state where the damping force of the shock absorber 111 is fixed. In addition, the damping force of the shock absorber 111 in the state A is smaller than the damping force of the shock absorber 111 in the state B.

As illustrated in FIG. 4, in a second frequency region 22 where the road surface input frequency F is relatively low, the gain X/Z in the state A is larger than the gain X/Z in the state B. In the second frequency region 22 where the road surface input frequency F is relatively low, the vehicle body 101 is more significantly moved in the vertical direction by sympathetic vibration in the state A, where the damping force of the shock absorber 111 is smaller than that in the state B, than in the state B. Thus, in the second frequency region 22 where the road surface input frequency F is relatively low, the gain X/Z in the state A is larger than the gain X/Z in the state B.

Meanwhile, as illustrated in FIG. 4, in a first frequency region 21 where the road surface input frequency F is relatively high, the gain X/Z in the state B is larger than the gain X/Z in the state A. In the state B where the damping force of the shock absorber 111 is larger than that in the state A, compared to the state A, the damping force of the shock absorber 111 acts in a manner to propagate the input from the road surface 120 to the vehicle body 101. Accordingly, in the first frequency region 21 where the road surface input frequency F is relatively high, in the state B where the damping force of the shock absorber 111 is larger than that in the state A, compared to the state A, a shock that is propagated from the unsprung portion 102 to the vehicle body 101 cannot be absorbed by the shock absorber 111, and consequently, the gain X/Z becomes large.

As the vertical motion of the vehicle body 101 is increased, a fluctuation in a contact patch load of the wheel 103 (in detail, a tire of the wheel 103) is increased. In addition, as the fluctuation in the contact patch load of the wheel 103 is increased, a grip force of the wheel 103 (in detail, the tire of the wheel 103) is reduced. Accordingly, in the second frequency region 22 where the road surface input frequency F is relatively low, the vertical motion of the vehicle body 101 can be suppressed with the large damping force of the shock absorber 111, and thus the grip force of the wheel 103 is increased. Meanwhile, in the first frequency region 21 where the road surface input frequency F is relatively high, the vertical motion of the vehicle body 101 can be suppressed with the small damping force of the shock absorber 111, and thus the grip force of the wheel 103 is increased.

By the way, the behavior of the vehicle body 101 during turning of the vehicle 100 is divided into a transient turning state and the stable turning state. The transient turning state is a state where the behavior of the vehicle body 101 is not stabilized and the degree of the change in the physical quantity associated with the travel posture of the vehicle body 101 becomes larger than that in the reference state. As described above, the stable turning state is the state where the behavior of the vehicle body 101 is stabilized and the degree of the change in the physical quantity associated with the travel posture of the vehicle body 101 becomes smaller than that in the reference state.

The following relationship is established between the behavior of the vehicle body 101 and the road surface input frequency F, which is the frequency input from the road surface 120 to the unsprung portion 102, during turning of the vehicle 100.

In the case where the vehicle 100 turns on the road surface 120 with the significant irregularities, the wheel 103 passes over the significant irregularities. Thus, the road surface input frequency F is relatively low. That is, in the case where the vehicle 100 turns on the road surface 120 with the significant irregularities, the road surface input frequency F falls within the second frequency region 22. In addition, in the case where the vehicle 100 turns on the road surface 120 with the significant irregularities, the vehicle body 101 swings significantly due to the irregularities of the road surface 120. Thus, in the case where the vehicle 100 turns on the road surface 120 with the significant irregularities, the behavior of the vehicle body 101 is brought into the transient turning state.

In the case where the vehicle 100 turns on the road surface 120 with the small irregularities such as gravel on the surface, the wheel 103 passes over the small irregularities. Thus, the road surface input frequency F becomes relatively high. That is, in the case where the vehicle 100 turns on the road surface 120 with the small irregularities, the road surface input frequency F falls within the first frequency region 21. In addition, in the case where the vehicle 100 turns on the road surface 120 with the small irregularities, swinging of the vehicle body 101 caused by the irregularities of the road surface 120 becomes insignificant. Thus, in the case where the vehicle 100 turns on the road surface 120 with the small irregularities, the behavior of the vehicle body 101 is stabilized and is thereafter brought into the stable turning state. That is, the behavior of the vehicle body 101 is brought into the stable turning state when the road surface input frequency F is in the first frequency region 21.

Here, conventionally, in consideration of turning performance, safety during turning, and the like, a preferred regular circular turning characteristic is set in advance per vehicle. The regular circular turning characteristic is a behavior characteristic that the vehicle exhibits when a vehicle speed is increased while a steering angle of a steering wheel remains constant during regular circular turning. More specifically, a vehicle, a turning radius of which is increased when the vehicle speed is increased while the steering angle of the steering wheel remains constant during the regular circular turning, is a vehicle, the regular circular turning characteristic of which is an understeer characteristic. On the other hand, a vehicle, a turning radius of which is reduced when the vehicle speed is increased while the steering angle of the steering wheel remains constant during the regular circular turning, is a vehicle, the regular circular turning characteristic of which is an oversteer characteristic. Furthermore, a vehicle, a turning radius of which is not changed when the vehicle speed is increased while the steering angle of the steering wheel remains constant during the regular circular turning, is a vehicle, the regular circular turning characteristic of which is a neutral steering characteristic. In general, the regular circular turning characteristic of the vehicle is set to the understeer characteristic. The regular circular turning characteristic of the vehicle 100 according to this embodiment is also set to the understeer characteristic. In detail, the regular circular turning characteristic of the vehicle 100 according to this embodiment is set to a slight understeer characteristic that is the understeer characteristic close to the neutral steering characteristic.

Conventionally, the vehicle such as the vehicle 100 that includes the shock absorber of the damping force adjustment type adjusts the damping force of the shock absorber during turning of the vehicle so as to suppress rolling that occurs to the vehicle body. In this case, in the conventional vehicle that includes the shock absorber of the damping force adjustment type, the damping force of the shock absorber is constantly adjusted during a turning period in order to suppress rolling that occurs to the vehicle body. However, in the stable turning state, a compression/extension speed of the shock absorber is low. Thus, in the stable turning state, even when control for suppressing rolling that occurs to the vehicle body is executed, such control insignificantly contributes to the suppression of rolling. Meanwhile, in the conventional vehicle that includes the shock absorber of the damping force adjustment type, the damping force of the shock absorber is adjusted even in the stable turning state in order to suppress rolling of the vehicle body. Accordingly, even when the regular circular turning characteristic differs from a desired regular circular turning characteristic during turning, the regular circular turning characteristic cannot be controlled.

To handle such a problem, when the vehicle 100 is brought into the stable turning state during turning, the controller 1 according to this embodiment outputs the command signal to the actuator 112 to adjust the damping force of the shock absorber 111, and controls the regular circular turning characteristic of the vehicle 100. A description will hereinafter be made on a specific control method for the regular circular turning characteristic of the vehicle 100 that is executed in the stable turning state with reference to FIG. 4, FIG. 5, and FIG. 6.

FIG. 5 and FIG. 6 are views for illustrating the control method for the regular circular turning characteristic that is executed by the controller according to the embodiment of the present invention in the stable turning state. FIG. 5 and FIG. 6 are plan views of the vehicle 100. In FIG. 5 and FIG. 6, the left side of each sheet corresponds to the front side of the vehicle 100. Outlined arrows in FIG. 5 and FIG. 6 each indicate a centripetal force (a cornering force) that is generated to the wheel 103 during turning. As size of the outlined arrow is increased, the centripetal force is increased.

First, a value that is acquired by subtracting the damping force of the rear wheel-side shock absorber from the damping force of the front wheel-side shock absorber is defined as a damping force subtracted value. In this embodiment, during forward straight travel of the vehicle, the damping forces of the front wheel-side shock absorber 111FL and the front wheel-side shock absorber 111FR are set to be the same. Also, during regular rolling, the damping forces of the front wheel-side shock absorber 111FL and the front wheel-side shock absorber 111FR are set to be the same. In addition, in this embodiment, during the forward straight travel of the vehicle, the damping forces of the rear wheel-side shock absorber 111RL and the rear wheel-side shock absorber 111RR are set to be the same. Also, during the regular rolling, the damping forces of the rear wheel-side shock absorber 111RL and the rear wheel-side shock absorber 111RR are set to be the same. Accordingly, in this embodiment, during the forward straight travel and during the regular rolling of the vehicle, the damping force subtracted value can be calculated by subtracting the damping force of one of the rear wheel-side shock absorber 111RL and the rear wheel-side shock absorber 111RR from the damping force of one of the front wheel-side shock absorber 111FL and the front wheel-side shock absorber 111FR.

Here, during the forward straight travel and during the regular rolling of the vehicle, the damping force of the front wheel-side shock absorber 111FL may differ from the damping force of the front wheel-side shock absorber 111FR. In such a case, when the damping force subtracted value is calculated during the forward straight travel and during the regular rolling of the vehicle, an average value of the damping force of the front wheel-side shock absorber 111FL and the damping force of the front wheel-side shock absorber 111FR is set as the damping force of the front wheel-side shock absorber. Similarly, during the forward straight travel and during the regular rolling of the vehicle, the damping force of the rear wheel-side shock absorber 111RL may differ from the damping force of the rear wheel-side shock absorber 111RR. In such a case, when the damping force subtracted value is calculated during the forward straight travel and during the regular rolling of the vehicle, an average value of the damping force of the rear wheel-side shock absorber 111RL and the damping force of the rear wheel-side shock absorber 111RR is set as the damping force of the rear wheel-side shock absorber.

For example, it is assumed that, when the damping force of the shock absorber 111 is adjusted by the conventional method during turning of the vehicle 100, the regular circular turning characteristic in the stable turning state is desirably set to a characteristic with a more oversteer tendency than the current condition. In such a case, when the vehicle 100 is brought into the stable turning state, the controller 1 outputs, to the actuator 112, the command signal that reduces the damping force subtracted value to be smaller than the damping force subtracted value during the forward straight travel of the vehicle 100. For example, when the vehicle 100 is brought into the stable turning state, the controller 1 outputs, to the actuator 112, such a command signal that reduces the damping forces of the front wheel-side shock absorber 111FL and the front wheel-side shock absorber 111FR to be smaller than those during the forward straight travel. At the same time, when the vehicle 100 is brought into the stable turning state, the controller 1 outputs, to the actuator 112, such a command signal that increases the damping forces of the rear wheel-side shock absorber 111RL and the rear wheel-side shock absorber 111RR to be larger than those during the forward straight travel. As a result, the damping force subtracted value in the stable turning state becomes smaller than the damping force subtracted value during the forward straight travel.

When the vehicle 100 is brought into the stable turning state, the controller 1 may only need to output, to the actuator 112, such a command signal that reduces the damping forces of the front wheel-side shock absorber 111FL and the front wheel-side shock absorber 111FR to be smaller than those during the forward straight travel. In addition, when the vehicle 100 is brought into the stable turning state, the controller 1 may only need to output, to the actuator 112, such a command signal that increases the damping forces of the rear wheel-side shock absorber 111RL and the rear wheel-side shock absorber 111RR to be larger than those during the forward straight travel. Even when the damping force of the shock absorber 111 is adjusted just as described, the damping force subtracted value in the stable turning state becomes smaller than the damping force subtracted value during the forward straight travel.

As described with reference to FIG. 4, the vehicle 100 is brought into the stable turning state when the road surface input frequency F is in the first frequency region 21. In addition, when the road surface input frequency F is in the first frequency region 21, the grip force of the wheel 103 is increased with the smaller damping force of the shock absorber 111. Here, the damping force subtracted value in the stable turning state is reduced to be smaller than the damping force subtracted value during the forward straight travel. In this way, the damping forces of the front wheel-side shock absorber 111FL and the front wheel-side shock absorber 111FR become smaller than the damping forces of the rear wheel-side shock absorber 111RL and the rear wheel-side shock absorber 111RR in the stable turning state when compared to those during the forward straight travel. Thus, when the damping force subtracted value in the stable turning state is reduced to be smaller than the damping force subtracted value during the forward straight travel, in the stable turning state, the grip forces of the front left wheel 103FL and the front right wheel 103FR become larger than the grip forces of the rear left wheel 103RL and the rear right wheel 103RR. For this reason, as illustrated in FIG. 5, when the damping force subtracted value in the stable turning state is reduced to be smaller than the damping force subtracted value during the forward straight travel, the centripetal forces generated to the front left wheel 103FL and the front right wheel 103FR become larger than the centripetal forces generated to the rear left wheel 103RL and the rear right wheel 103RR. Thus, compared to a case where the damping force of the shock absorber 111 is adjusted by the conventional method during turning of the vehicle 100, the regular circular turning characteristic in the stable turning state of the vehicle 100 can be controlled to the characteristic with the oversteer tendency.

For example, it is assumed that, when the damping force of the shock absorber 111 is adjusted by the conventional method during turning of the vehicle 100, the regular circular turning characteristic in the stable turning state is desirably set to a characteristic with a more understeer tendency than the current condition. In such a case, when the vehicle 100 is brought into the stable turning state, the controller 1 outputs, to the actuator 112, the command signal that increases the damping force subtracted value to be larger than the damping force subtracted value during the forward straight travel of the vehicle 100. For example, when the vehicle 100 is brought into the stable turning state, the controller 1 outputs, to the actuator 112, such a command signal that increases the damping forces of the front wheel-side shock absorber 111FL and the front wheel-side shock absorber 111FR to be larger than those during the forward straight travel. At the same time, when the vehicle 100 is brought into the stable turning state, the controller 1 outputs, to the actuator 112, such a command signal that reduces the damping forces of the rear wheel-side shock absorber 111RL and the rear wheel-side shock absorber 111RR to be smaller than those during the forward straight travel. As a result, the damping force subtracted value in the stable turning state becomes larger than the damping force subtracted value during the forward straight travel.

When the vehicle 100 is brought into the stable turning state, the controller 1 may only need to output, to the actuator 112, such a command signal that increases the damping forces of the front wheel-side shock absorber 111FL and the front wheel-side shock absorber 111FR to be larger than those during the forward straight travel. In addition, when the vehicle 100 is brought into the stable turning state, the controller 1 may only need to output, to the actuator 112, such a command signal that reduces the damping forces of the rear wheel-side shock absorber 111RL and the rear wheel-side shock absorber 111RR to be smaller than those during the forward straight travel. Even when the damping force of the shock absorber 111 is adjusted just as described, the damping force subtracted value in the stable turning state becomes larger than the damping force subtracted value during the forward straight travel.

As described with reference to FIG. 4, the vehicle 100 is brought into the stable turning state when the road surface input frequency F is in the first frequency region 21. In addition, when the road surface input frequency F is in the first frequency region 21, the grip force of the wheel 103 is increased with the smaller damping force of the shock absorber 111. Here, the damping force subtracted value in the stable turning state is increased to be larger than the damping force subtracted value during the forward straight travel. In this way, the damping forces of the rear wheel-side shock absorber 111RL and the rear wheel-side shock absorber 111RR become smaller than the damping forces of the front wheel-side shock absorber 111FL and the front wheel-side shock absorber 111FR in the stable turning state when compared to those during the forward straight travel. Thus, when the damping force subtracted value in the stable turning state is increased to be larger than the damping force subtracted value during the forward straight travel, in the stable turning state, the grip forces of the rear left wheel 103RL and the rear right wheel 103RR become larger than the grip forces of the front left wheel 103FL and the front right wheel 103FR. For this reason, as illustrated in FIG. 6, when the damping force subtracted value in the stable turning state is increased to be larger than the damping force subtracted value during the forward straight travel, the centripetal forces generated to the rear left wheel 103RL and the rear right wheel 103RR become larger than the centripetal forces generated to the front left wheel 103FL and the front right wheel 103FR. Thus, compared to a case where the damping force of the shock absorber 111 is adjusted by the conventional method during turning of the vehicle 100, the regular circular turning characteristic in the stable turning state of the vehicle 100 can be controlled to the characteristic with the understeer tendency.

The controller 1 that executes the control as described above can be configured as follows, for example. A description will hereinafter be made on the detailed configuration of the controller 1 according to this embodiment.

<Detailed Configuration of Controller>

FIG. 7 is a block diagram illustrating the controller according to the embodiment of the present invention.

The controller 1 includes a vehicle state determination section 2 and a control section 3.

The vehicle state determination section 2 is a functional section that determines whether the vehicle 100 is in the stable turning state. The vehicle state determination section 2 is configured to receive a detection value by the roll rate detection sensor 113. In addition, in this embodiment, the vehicle state determination section 2 is also configured to receive detection values by the acceleration sensor 114 and the acceleration sensor 115. As described above, in this embodiment, the stable rolling state where, during turning of the vehicle 100, the roll rate of the vehicle body 101 is lower than that in the reference state is set as the stable turning state. Thus, the vehicle state determination section 2 determines whether the following formula (1) is satisfied.

$$Rr \leq T1 \quad (1)$$

Here, Rr is the roll rate of the vehicle body 101. In other words, Rr is the detection value by the roll rate detection sensor 113. T1 is a threshold value. That is, the formula (1) is satisfied when the roll rate Rr of the vehicle body 101 is equal to or lower than the threshold value T1. When the vehicle 100 is in the stable turning state, the degree of the change in the physical quantity associated with the travel posture of the vehicle body 101 is smaller than that in the reference state, and the roll rate Rr is also reduced. Thus, the formula (1) is satisfied. Here, a condition that the roll rate Rr of the vehicle body 101 is lower than the threshold value T1 may be set as the condition of determining whether the vehicle 100 is in the stable turning state by using the roll rate Rr of the vehicle body 101. That is, as the condition of determining that the vehicle 100 is in the stable turning state, the vehicle state determination section 2 includes the condition that the roll rate Rr of the vehicle body 101 is equal to or lower than the threshold value T1 or the condition that the roll rate Rr of the vehicle body 101 is lower than the threshold value T1. Hereinafter, such a condition will be referred to as a first condition.

Here, it is needless to say that, when the above first condition is satisfied, the vehicle state determination section 2 may determine that the vehicle 100 is in the stable turning state. However, in consideration of various operation postures of the vehicle 100, such a possibility is considered that the first condition is satisfied when the vehicle 100 is not in the turning state. Thus, in this embodiment, in order to improve reliability of detection that the vehicle 100 is in the stable turning state, the vehicle state determination section 2 includes, in addition to the first condition, a condition of determining whether the vehicle 100 is in the turning state as the condition of determining that the vehicle 100 is in the stable turning state. More specifically, the vehicle state determination section 2 determines whether a second condition expressed by the following formula (2) is satisfied.

$$|AD2| \geq T2 \quad (2)$$

Here, AD2 is the lateral acceleration of the vehicle body 101. That is, AD2 is a detection value by the acceleration sensor 115. T2 is a threshold value. During turning of the vehicle 100, the lateral acceleration is generated in the vehicle body 101. Thus, when the second condition expressed by the formula (2) is satisfied in addition to the first condition, the vehicle state determination section 2 determines that the vehicle 100 is in the stable turning state. That is, the second condition is a condition that an absolute value of the lateral acceleration AD2 in the vehicle body 101 is equal to or higher than the threshold value T2. Here, a condition that the absolute value of the lateral acceleration AD2 in the vehicle body 101 becomes higher than the threshold value T2 may be set as the second condition. When the second condition is not satisfied, the vehicle state determination section 2 determines that the vehicle 100 is not turning.

In this embodiment, in order to further improve the reliability of the detection that the vehicle 100 is in the stable turning state, as the condition of determining that the vehicle 100 is in the stable turning state, the vehicle state determination section 2 determines, in addition to the first condition and the second condition, whether a third condition expressed by the following formula (3) is satisfied.

$$|AD1| \leq T3 \quad (3)$$

Here, AD1 is the vertical acceleration of the vehicle body 101. That is, AD1 is a detection value by the acceleration sensor 114. T3 is a threshold value. When the vehicle 100 is in the stable turning state, the degree of the change in the physical quantity associated with the travel posture of the vehicle body 101 is smaller than that in the reference state, and thus the vertical motion of the vehicle body 101 is also reduced. Thus, the formula (3) is satisfied. Here, a condition that an absolute value of the vertical acceleration AD1 in the vehicle body 101 becomes lower than the threshold value T3 may be set as the third condition.

That is, when all of the first condition, the second condition, and the third condition are satisfied, the vehicle state determination section 2 according to this embodiment determines that the behavior of the vehicle 100 is in the stable turning state. On the other hand, when at least one of the first condition and the third condition is not satisfied while the second condition is satisfied, the vehicle state determination section 2 determines that the behavior of the vehicle 100 is in the transient turning state.

The control section 3 is a functional section that outputs the command signal to the actuator 112 as described above to adjust the damping force of the shock absorber 111 and controls the regular circular turning characteristic of the vehicle 100 when the vehicle state determination section 2 determines that the vehicle 100 is in the stable turning state. In this embodiment, the control section 3 is configured to output the command signal to the actuator 112, adjust the damping force of the shock absorber 111, and execute known control for suppressing rolling of the vehicle body 101 when the vehicle state determination section 2 determines that the vehicle 100 is in the transient turning state.

<Operation of Controller>

Next, a description will be made on operation of the controller 1.

FIG. 8 is a flowchart illustrating the operation of the controller according to the embodiment of the present invention.

When a control initiation condition is satisfied, in step S1, the controller 1 initiates the control illustrated in FIG. 8. The control initiation condition is that the vehicle state determination section 2 of the controller 1 determines that the vehicle 100 is turning, for example. Step S2 is a stable turning state determination step. In step S2, the vehicle state determination section 2 determines whether the behavior of the vehicle 100 is in the stable turning state. If the vehicle state determination section 2 determines that the behavior of the vehicle 100 is not in the stable turning state, the controller 1 determines that the behavior of the vehicle 100 is in the transient turning state, and the processing proceeds to step S3. Step S3 is a rolling suppression control step. In step S3, the control section 3 of the controller 1 outputs the command signal to the actuator 112 to adjust the damping force of the shock absorber 111, and executes the known control for suppressing rolling of the vehicle body 101.

On the other hand, if the vehicle state determination section 2 determines that the behavior of the vehicle 100 is in the stable turning state, the processing of the controller 1 proceeds to step S4. Step S4 is a regular circular turning characteristic control step. In step S4, the control section 3 outputs the command signal to the actuator 112 to adjust the damping force of the shock absorber 111, and controls the regular circular turning characteristic of the vehicle 100 as described above. That is, the regular circular turning characteristic control step in step S4 is a control step of outputting the command signal to the actuator 112 to adjust the damping force of the shock absorber 111 and controlling the regular circular turning characteristic of the vehicle 100 when the vehicle 100 is brought into the stable turning state where the vehicle 100 turns in a state where the degree of the change in the physical quantity associated with the travel posture is smaller than that in the reference state.

Step S5 after step S3 or step S4 is a termination condition determination step. In step S5, the controller 1 determines whether a control termination condition described in step S2 to step S4 is satisfied. If the termination condition is not satisfied, the processing returns to step S2, and the controller 1 repeats the control in step S2 to step S4. On the other hand, if the termination condition is satisfied, the processing proceeds to step S6, and the controller 1 terminates the control illustrated in FIG. 8. A case where the termination condition is satisfied is a case where the vehicle state determination section 2 of the controller 1 determines that the vehicle 100 is not turning, for example.

<Effects of Controller>

The controller 1 is mounted to the vehicle 100 that includes the shock absorber 111 of the damping force adjustment type provided between the vehicle body 101 and the wheel 103. The controller 1 outputs the command signal, which corresponds to the damping force of the shock absorber 111, to the actuator 112, which adjusts the damping force of the shock absorber 111. In addition, the controller 1 is configured to output the command signal to the actuator 112 to adjust the damping force of the shock absorber 111 and control the regular circular turning characteristic of the vehicle 100 when the vehicle 100 is brought into the stable turning state where the degree of the change in the physical quantity associated with the travel posture is smaller than that in the reference state.

In the conventional vehicle including the shock absorber of the damping force adjustment type provided between the vehicle body and the wheel, the regular circular turning characteristic cannot be controlled during turning even when the regular circular turning characteristic differs from the desired regular circular turning characteristic. However, as described above, in the stable turning state, the controller 1 according to this embodiment can control the regular circular turning characteristic of the vehicle 100. Therefore, the controller 1 according to this embodiment can control the regular circular turning characteristic of the vehicle 100 during turning.

Modified Examples

FIG. 9 is a plan view illustrating a modified example of the vehicle according to the embodiment of the present invention. FIG. 10 is a block diagram illustrating the modified example of the controller according to the embodiment of the present invention and is a block diagram illustrating the controller mounted to the vehicle illustrated in FIG. 9.

As described above, in this embodiment, the roll rate is adopted as the physical quantity associated with the travel posture of the vehicle body 101 at the time of determining the stable turning state. However, the physical quantity that is used to determine the stable turning state is not limited to the roll rate of the vehicle body 101. In the stable turning state where the behavior of the vehicle body 101 is stabilized and the degree of the change in the physical quantity associated with the travel posture of the vehicle body 101 becomes smaller than that in the reference state, the cornering forces generated to the front wheel and the rear wheel are stabilized, and a change amount of a yaw rate per unit time is reduced. In other words, a differential value of the yaw rate is reduced in the stable turning state. That is, in the stable turning state, angular acceleration in a yaw direction of the vehicle 100 is reduced. For this reason, the change amount of the yaw rate per unit time of the vehicle body 101 can be used as the physical quantity associated with the travel posture of the vehicle body 101 at the time of determining the stable turning state, for example.

In the case where the change amount of the yaw rate per unit time of the vehicle body 101 is used as the physical quantity that is used at the time of determining the stable turning state, the vehicle 100 is configured as illustrated in FIG. 9 and FIG. 10, for example. In the vehicle 100 illustrated in FIG. 9 and FIG. 10, during turning of the vehicle 100, a stable yaw state where the change amount of the yaw rate per unit time of the vehicle body 101 is smaller than that in the reference state is set as the stable turning state. For this reason, the vehicle 100 illustrated in FIG. 9 and FIG. 10 includes a yaw rate detection sensor 116 that detects the yaw rate of the vehicle body 101. The yaw rate detection sensor 116 is provided to the vehicle body 101 and is electrically connected to the controller 1. The yaw rate detection sensor 116 may be a different sensor from the other sensors or may be constructed as one unit at least with one of the other sensors.

The vehicle state determination section 2 of the controller 1, which is mounted to the vehicle 100 illustrated in FIG. 9 and FIG. 10, is configured to receive a detection value by the yaw rate detection sensor 116. Then, instead of the first condition, for which the above-described roll rate Rr is used, the vehicle state determination section 2 determines whether the first condition, for which the change amount Yr of the yaw rate per unit time expressed in the following formula (4), is satisfied.

$$Yr \leq T4 \qquad (4)$$

Here, Yr is the change amount of the yaw rate per unit time of the vehicle body 101. More specifically, Yr is a value that is acquired by differentiating the detection value by the yaw rate detection sensor 116. T4 is a threshold value. That is, when the change amount Yr of the yaw rate per unit time of the vehicle body 101 is equal to or smaller than the threshold value T4, the first condition expressed by the formula (4) is satisfied. When the vehicle 100 is in the stable turning state, the degree of the change in the physical quantity associated with the travel posture of the vehicle body 101 is smaller than that in the reference state, and the change amount Yr of the yaw rate per unit time is also reduced. Thus, the first condition expressed by the formula (4) is satisfied. Here, a condition that the change amount Yr of the yaw rate per unit time of the vehicle body 101 is smaller than the threshold value T4 may be set as the first condition of determining whether the vehicle 100 is in the stable turning state by using the change amount Yr of the yaw rate per unit time of the vehicle body 101. That is, as the condition of determining that the vehicle 100 is in the stable turning state, the vehicle state determination section 2 of the controller 1, which is mounted to the vehicle 100 illustrated in FIG. 9 and FIG. 10, includes the condition that the change amount Yr of the yaw rate per unit time of the vehicle body 101 is equal to or smaller than the threshold value T4 or the condition that the change amount Yr of the yaw rate per unit time of the vehicle body 101 is smaller than the threshold value T4.

As described above, even when the change amount of the yaw rate per unit time of the vehicle body 101 is used as the physical quantity that is used at the time of determining the stable turning state, the stable turning state can be determined, and the regular circular turning characteristic of the vehicle 100 can be controlled in the stable turning state. Here, the vehicle state determination section 2 of the controller 1, which is mounted to the vehicle 100 illustrated in FIG. 9 and FIG. 10, may include both of the first condition, for which the roll rate Rr is used, and the first condition, for which the change amount Yr of the yaw rate per unit time is used. That is, the vehicle state determination section 2 of the controller 1, which is mounted to the vehicle 100 illustrated in FIG. 9 and FIG. 10, may be configured to determine that the vehicle 100 is in the stable turning state when both of the first condition, for which the roll rate Rr is used, and the first condition, for which the change amount Yr of the yaw rate per unit time is used, are satisfied.

FIG. 11 is a plan view illustrating another modified example of the vehicle according to the embodiment of the present invention. FIG. 12 is a block diagram illustrating another modified example of the controller according to the embodiment of the present invention and is a block diagram illustrating the controller mounted to the vehicle illustrated in FIG. 11.

The vehicle 100 starts turning when the steering angle of the steering wheel is increased. In the case where there is no element such as the significant irregularities of the road surface 120 that disrupts the behavior of the vehicle 100, a steering angular velocity of the steering wheel that is a change amount of the steering angle of the steering wheel per unit time is reduced when the desired turning radius of the vehicle 100 is achieved. Thereafter, the vehicle 100 is brought into the stable turning state. For this reason, the steering angular velocity of the steering wheel can be used as the physical quantity associated with the travel posture of the vehicle body 101 at the time of determining the stable turning state, for example.

In the case where the steering angular velocity of the steering wheel is used as the physical quantity that is used at the time of determining the stable turning state, the vehicle 100 is configured as illustrated in FIG. 11 and FIG. 12, for example. In the vehicle 100 illustrated in FIG. 11 and FIG. 12, during turning of the vehicle 100, a stable steering state where the steering angular velocity of the steering wheel is lower than that in the reference state is set as the stable turning state. For this reason, the vehicle 100 illustrated in FIG. 11 and FIG. 12 includes a sensor that is used to detect the steering angular velocity of the steering wheel. For example, as such a sensor, the vehicle 100 illustrated in FIG. 11 and FIG. 12 includes a steering angle detection sensor 117 that detects the steering angle of the steering wheel. The steering angle detection sensor 117 is provided to the vehicle body 101 and is electrically connected to the controller 1. That is, the controller 1 can acquire the steering angular velocity of the steering wheel by differentiating a detection value by the steering angle detection sensor 117. The steering angle detection sensor 117 may be a different sensor from the other sensors or may be constructed as one unit at least with one of the other sensors.

The vehicle state determination section 2 of the controller 1, which is mounted to the vehicle 100 illustrated in FIG. 11 and FIG. 12, is configured to receive the detection value by the steering angle detection sensor 117. Then, instead of the first condition, for which the roll rate Rr is used, and the first condition, for which the change amount Yr of the yaw rate per unit time is used, described above, the vehicle state determination section 2 determines whether the first condition, for which a steering angular velocity Sav of the steering wheel expressed in the following formula (5), is satisfied.

$$Sav \leq T5 \qquad (5)$$

Here, Sav is the steering angular velocity of the steering wheel. In other words, the vehicle state determination section 2 acquires the steering angular velocity of the steering wheel by differentiating the detection value by the steering angle detection sensor 117. T5 is a threshold value. That is, when the steering angular velocity Sav of the steering wheel is equal to or lower than the threshold value T5, the first condition expressed by the formula (5) is satisfied. When the vehicle 100 is in the stable turning state, the degree of the change in the physical quantity associated with the travel posture of the vehicle body 101 is smaller than that in the reference state, and thus the steering angular velocity Sav of the steering wheel is also reduced. Thus, the first condition expressed by the formula (5) is satisfied. Here, a condition that the steering angular velocity Sav of the steering wheel is lower than the threshold value T5 may be set as the first condition of determining whether the vehicle 100 is in the stable turning state by using the steering angular velocity Sav of the steering wheel. That is, as the condition of determining that the vehicle 100 is in the stable turning state, the vehicle state determination section 2 of the controller 1, which is mounted to the vehicle 100 illustrated in FIG. 11 and FIG. 12, includes a condition that the steering angular velocity Sav of the steering wheel is equal to or lower than the threshold value T5 or a condition that the steering angular velocity Sav of the steering wheel is lower than the threshold value T5.

As described above, even when the steering angular velocity of the steering wheel is used as the physical quantity that is used at the time of determining the stable turning state, the stable turning state can be determined, and the regular circular turning characteristic of the vehicle 100 can be controlled in the stable turning state. Here, the vehicle state determination section 2 of the controller 1, which is mounted to the vehicle 100 illustrated in FIG. 11 and FIG. 12, may include, in addition to the first condition, for which the steering angular velocity Sav of the steering wheel is used, at least one of the first condition, for which the roll rate Rr is used, and the first condition, for which the change amount Yr of the yaw rate per unit time is used. That is, the vehicle state determination section 2 of the controller 1, which is mounted to the vehicle 100 illustrated in FIG. 11 and FIG. 12, may be configured to determine that the vehicle 100 is in the stable turning state when the first condition, for which the steering angular velocity Sav of the steering wheel is used, is satisfied and the first condition as one of the first condition, for which the roll rate Rr is used, and the first condition, for which the change amount Yr of the yaw rate per unit time is used, provided to the vehicle state determination section 2 is satisfied.

Here, as described above, in order to improve the reliability of the detection that the vehicle 100 is in the stable turning state, the vehicle state determination section 2 may include, as the condition of determining that the vehicle 100 is in the stable turning state, the condition of determining whether the vehicle 100 is in the turning state in addition to at least one of the above-described first conditions. At this time, in the vehicle 100 that includes the steering angle detection sensor 117, it may be determined whether the vehicle 100 is in the turning state by using the detection value by the steering angle detection sensor 117. More specifically, when the steering angle of the steering wheel is equal to or larger than the threshold value or when the steering angle of the steering wheel is larger than the threshold value, the vehicle state determination section 2 can determine whether the vehicle 100 is in the turning state.

In the above-described vehicle 100, both of the front wheel-side shock absorbers (the front wheel-side shock absorber 111FL and the front wheel-side shock absorber 111FR) and the rear wheel-side shock absorbers (the rear wheel-side shock absorber 111RL and the rear wheel-side shock absorber 111RR) are the shock absorbers 111 of the damping force adjustment type. However, the front wheel-side shock absorbers and the rear wheel-side shock absorbers are not limited thereto. At least one of each of the front wheel-side shock absorbers and each of the rear wheel-side shock absorbers has to be the shock absorber 111 of the damping force adjustment type. Even with such a configuration, the damping force subtracted value in the stable turning state can differ from the damping force subtracted value during the forward straight travel. Therefore, even with such a configuration, in the stable turning state, the regular circular turning characteristic of the vehicle 100 can be controlled.

FIG. 13 is a plan view illustrating further another modified example of the vehicle according to the embodiment of the present invention. FIG. 14 is a block diagram illustrating further another modified example of the controller according to the embodiment of the present invention and is a block diagram illustrating the controller mounted to the vehicle illustrated in FIG. 13.

In regard to the vehicle 100 according to further another modified example illustrated in FIG. 13, a signal output device 118 is added to the above-described vehicle 100. FIG. 13 and FIG. 14 illustrate an example in which the signal output device 118 is added to the vehicle 100. The signal output device 118 outputs a signal corresponding to a speed of the vehicle 100. The signal output device 118 is electrically connected to the controller 1 illustrated in FIG. 13 and FIG. 14.

Conventionally, various configurations are adopted to calculate the speed of the vehicle. Accordingly, any of various signals that have conventionally been used can be used as the signal corresponding to the speed of the vehicle 100. In addition, as the signal output device 118 that outputs the signal corresponding to the speed of the vehicle 100, any of various signal output devices, each of which outputs the signal conventionally used to calculate the speed of the vehicle, can be used. For example, a configuration to calculate the speed of the vehicle on the basis of a gear stage of a transmission and an engine speed has conventionally been known. In the case where such a configuration is adopted for the vehicle 100, the signal that is output from the signal output device 118 is a signal related to the gear stage of the transmission and the engine speed. For example, a configuration to calculate the speed of the vehicle on the basis of a wheel rotational frequency has conventionally been known. In the case where such a configuration is adopted for the vehicle 100, the signal that is output from the signal output device 118 is a signal related to the wheel rotational frequency.

The vehicle state determination section 2 of the controller 1 illustrated in FIG. 13 and FIG. 14 is configured to receive a detection value by the signal output device 118. The vehicle state determination section 2 of the controller 1 illustrated in FIG. 13 and FIG. 14 determines that the vehicle 100 is in the stable turning state when, in addition to the above-described conditions, a fourth condition, which will be described below, is further satisfied.

$$V \geq V1 \quad (6)$$

The fourth condition is expressed by the formula (6). Here, V is the speed of the vehicle 100. V1 is a prescribed speed. When the formula (6) is satisfied, the vehicle state determination section 2 determines that the fourth condition is satisfied. That is, the fourth condition is a condition that the speed V of the vehicle 100 is equal to or higher than the prescribed speed V1. A condition that the speed V of the vehicle 100 is higher than the prescribed speed V1 may be set as the fourth condition. That is, as the condition of determining that the vehicle 100 is in the stable turning state, the vehicle state determination section 2 includes the condition that the speed V of the vehicle 100 is equal to or higher than the prescribed speed V1 or the condition that the speed V of the vehicle 100 is higher than the prescribed speed V1.

For example, it is assumed that the vehicle 100 is stopped on an inclined surface that is inclined in the lateral direction of the vehicle 100. In this state, there is a case where the first condition, the second condition, and the third condition are satisfied. In such a case, when the vehicle state determination section 2 does not determine the fourth condition, the above-described control for the regular circular turning characteristic is executed in the stopped vehicle 100. However, the above-described control for the regular circular turning characteristic is unnecessary for the stopped vehicle 100. Therefore, when the vehicle state determination section 2 determines the fourth condition, it is possible to suppress execution of the above-described control for the regular circular turning characteristic in the stopped vehicle 100.

The vehicle 100 according to this embodiment is the off-road vehicle. There is a case where the off-road vehicle drives through a rock section in which the off-road vehicle drives slowly over a large rock. In this state, there is a case where the vehicle 100 is tilted when the vehicle 100 drives over the rock, and the first condition, the second condition, and the third condition are satisfied. In such a case, when the vehicle state determination section 2 does not determine the fourth condition, the above-described control for the regular circular turning characteristic is executed. However, the above-described control for the regular circular turning characteristic is unnecessary for the vehicle 100 that currently travels in the rock section. Therefore, when the vehicle state determination section 2 determines the fourth condition, it is possible to suppress the execution of the above-described control for the regular circular turning characteristic in the vehicle 100 that currently travels in the rock section.

The vehicle 100 according to this embodiment may be an on-road vehicle. A road surface on which the on-road vehicle travels is made from asphalt or the like and is smoother than the road surface traveled by the off-road vehicle. However, the small irregularities also exist on the surface of asphalt or the like. Accordingly, even when the on-road vehicle is in the stable turning state, the road surface input frequency F is in the first frequency region 21 where the frequency is relatively high. Therefore, even when the vehicle 100 is the on-road vehicle, in the stable turning state, the regular circular turning characteristic of the vehicle 100 can be controlled as described above.

The description has been made so far on the controller 1 according to this embodiment. However, the controller according to the present invention is not limited to that in the description of this embodiment, and only a part of this embodiment may be implemented.

REFERENCE SIGNS LIST

1: Controller
2: Vehicle state determination section
3: Control section
21: First frequency region
22: Second frequency region
100: Vehicle
101: Vehicle body
102: Unsprung portion
103: Wheel
103FL: Front left wheel
103FR: Front right wheel
103RL: Rear left wheel
103RR: Rear right wheel
110 (110FL, 110FR, 110RL, 110RR): Spring
111: Shock absorber
111FL, 111FR: Front wheel-side shock absorber
111RL, 111RR: Rear wheel-side shock absorber
112 (112FL, 112FR, 112RL, 112RR): Actuator
113: Roll rate detection sensor
114: Acceleration sensor
115: Acceleration sensor
116: Yaw rate detection sensor
117: Steering angle detection sensor
118: Signal output device
120: Road surface

The invention claimed is:

1. A controller that is mounted to a vehicle, the vehicle including a front wheel-side shock absorber of a damping force adjustment type provided between a vehicle body and a front wheel of the vehicle and a rear wheel-side shock absorber of the damping force adjustment type provided between the vehicle body and a rear wheel of the vehicle, and outputs a command signal corresponding to a damping force of the front wheel-side shock absorber to a front wheel-side actuator that adjusts the damping force of the front wheel-side shock absorber and a command signal corresponding to a damping force of the rear wheel-side shock absorber to a rear wheel-side actuator that adjusts the damping force of the rear wheel-side shock absorber, wherein the controller is configured to determine if the vehicle is brought into a stable turning state based on a roll rate of the vehicle body, a change amount of a yaw rate per unit time of the vehicle body, and/or a steering angular velocity of a steering wheel of the vehicle, and wherein the controller is configured to, in a case where a value that is acquired by subtracting the damping force of the rear wheel-side shock absorber from the damping force of the front wheel-side shock absorber is defined as a damping force subtracted value, output the command signal to the front wheel-side actuator and the command signal to the rear wheel-side actuator so that the damping force subtracted value becomes smaller or larger than the damping force subtracted value during straight travel of the vehicle, when it is determined that the vehicle is brought into the stable turning state, wherein the controller is further configured to determine the damping force subtracted value.

2. A controller that is mounted to a vehicle, the vehicle including a front wheel-side shock absorber of a damping force adjustment type and provided between a vehicle body and a front wheel of the vehicle and a rear wheel-side shock absorber of a non-damping force adjustment type provided between the vehicle body and a rear wheel of the vehicle, and outputs a command signal corresponding to, a damping force of the front wheel-side shock absorber to a front wheel-side actuator that adjusts the damping force of the front wheel-side shock absorber, wherein the controller is configured to determine if the vehicle is brought into a stable turning state based on a roll rate of the vehicle body, a change amount of a yaw rate per unit time of the vehicle body, and/or a steering angular velocity of a steering wheel of the vehicle, and wherein the controller is configured to, in a case where a value that is acquired by subtracting a damping force of the rear wheel-side shock absorber from the damping force of the front wheel-side shock absorber is defined as a damping force subtracted value, output the command signal to the front wheel-side actuator so that the damping force subtracted value becomes smaller or larger than the damping force subtracted value during forward straight travel of the vehicle, when it is determined that the vehicle is brought into the stable turning state, wherein the controller is further configured to determine the damping force subtracted value.

3. A controller that is mounted to a vehicle, the vehicle including a front wheel-side shock absorber of a non-damping force adjustment type and provided between a vehicle body and a front wheel of the vehicle and a rear wheel-side shock absorber of a damping force adjustment type provided between the vehicle body and a rear wheel of the vehicle, and outputs a command signal corresponding to a damping force of the rear wheel-side shock absorber to a rear wheel-side actuator that adjusts the damping force of the rear wheel-side shock absorber,
- wherein the controller is configured to determine if the vehicle is brought into a stable turning state based on a roll rate of the vehicle body, a change amount of a yaw rate per unit time of the vehicle body, and/or a steering angular velocity of a steering wheel of the vehicle, and
- wherein the controller is configured to, in a case where a value that is acquired by subtracting the damping force of the rear wheel-side shock absorber from a damping force of the front wheel-side shock absorber is defined as a damping force subtracted value, output the command signal to the rear wheel-side actuator so that the damping force subtracted value becomes smaller or larger than the damping force subtracted value during forward straight travel of the vehicle when it is determined that the vehicle is brought into the stable turning state.

4. A control method for outputting a command signal corresponding to a damping force of a front wheel-side shock absorber of a damping force adjustment type to a front wheel-side actuator and a command signal corresponding to a damping force of a rear wheel-side shock absorber of a damping force adjustment type to a rear wheel-side actuator, the control method being used for a vehicle that includes: the front wheel-side shock absorber provided between a vehicle body and a front wheel of the vehicle, the front wheel-side actuator that adjusts the damping force of the front wheel-side shock absorber, the rear wheel-side shock absorber provided between the vehicle body and a rear wheel of the vehicle, and the rear wheel-side actuator that adjusts the damping force of the rear wheel-side shock absorber, the control method comprising:
- determining if the vehicle is brought into a stable turning state based on a roll rate of the vehicle body, a change amount of a yaw rate per unit time of the vehicle body, and/or a steering angular velocity of a steering wheel of the vehicle, and
- outputting, in the case where a value that is acquired by subtracting the damping force of the rear wheel-side shock absorber from the damping force of the front wheel-side shock absorber is defined as a damping force subtracted value, the command signal to the front wheel-side actuator and the command signal to the rear wheel-side actuator so that the damping force subtracted value becomes smaller or larger than the damping force subtracted value during forward straight travel of the vehicle, when it is determined that the vehicle is brought into the stable turning state,
- wherein the controller is further configured to determine the damping force subtracted value.

5. A control method for outputting a command signal corresponding to a damping force of a front wheel-side shock absorber of a damping force adjustment type to a front wheel-side actuator, the control method being used for a vehicle that includes: the front wheel-side shock absorber provided between a vehicle body and a front wheel of the vehicle, the front wheel-side actuator that adjusts the damping force of the front wheel-side shock absorber, and a rear wheel-side shock absorber of a non-damping force adjustment type provided between the vehicle body and a rear wheel of the vehicle, the control method comprising:
- determining if the vehicle is brought into a stable turning state based on a roll rate of the vehicle body, a change amount of a yaw rate per unit time of the vehicle body, and/or a steering angular velocity of a steering wheel of the vehicle, and
- outputting, in the case where a value that is acquired by subtracting a damping force of the rear wheel-side shock absorber from the damping force of the front wheel-side shock absorber is defined as a damping force subtracted value, the command signal to the front wheel-side actuator so that the damping force subtracted value becomes smaller or larger than the damping force subtracted value during forward straight travel of the vehicle, when it is determined that the vehicle is brought into the stable turning state,
- wherein the controller is further configured to determine the damping force subtracted value.

6. A control method for outputting a command signal corresponding to a damping force of a rear wheel-side shock absorber of a damping force adjustment type to a rear wheel-side actuator, the control method being used for a vehicle that includes: a front wheel-side shock absorber of a non-damping force adjustment type provided between a vehicle body and a front wheel of the vehicle, the rear wheel-side shock absorber provided between the vehicle body and a rear wheel of the vehicle, and the rear wheel-side actuator that adjusts the damping force of the rear wheel-side shock absorber, the control method comprising:
- determining if the vehicle is brought into a stable turning state based on a roll rate of the vehicle body, a change amount of a yaw rate per unit time of the vehicle body, and/or a steering angular velocity of a steering wheel of the vehicle, and
- outputting, in the case where a value that is acquired by subtracting the damping force of the rear wheel-side shock absorber from a damping force of the front wheel-side shock absorber is defined as a damping force subtracted value, the command signal to the rear wheel-side actuator so that the damping force subtracted value becomes smaller or larger than the damping force subtracted value during forward straight travel of the vehicle, when it is determined that the vehicle is brought into the stable turning state.

* * * * *